(12) United States Patent
Heinz et al.

(10) Patent No.: US 12,330,601 B2
(45) Date of Patent: Jun. 17, 2025

(54) METHOD FOR OPERATING A VEHICLE TREATMENT SYSTEM, VEHICLE TREATMENT SYSTEM, USE OF A VEHICLE TREATMENT SYSTEM, AND COMPUTER PROGRAM PRODUCT

(71) Applicant: Washtec Holding GmbH, Augsburg (DE)

(72) Inventors: Bernhard Heinz, Gersthofen (DE); Oliver Foerg, Augsburg (DE); David Stecher, Monheim (DE)

(73) Assignee: Washtec Holding GmbH, Augsburg (DE)

( * ) Notice: Subject to any disclaimer, the term of this patent is extended or adjusted under 35 U.S.C. 154(b) by 471 days.

(21) Appl. No.: 17/536,659

(22) Filed: Nov. 29, 2021

(65) Prior Publication Data

US 2022/0080932 A1    Mar. 17, 2022

Related U.S. Application Data

(63) Continuation of application No. PCT/EP2020/064561, filed on May 26, 2020.

(30) Foreign Application Priority Data

May 29, 2019   (DE) ...................... 10 2019 114 457.4

(51) Int. Cl.
  *B60S 3/06*  (2006.01)
  *A46B 13/00*  (2006.01)
  (Continued)

(52) U.S. Cl.
  CPC .............. *B60S 3/06* (2013.01); *A46B 13/001* (2013.01); *A46B 13/02* (2013.01);
  (Continued)

(58) Field of Classification Search
  CPC ...... B60S 3/063; B60S 3/06; B60S 3/04–066; A46B 13/001; A46B 13/02; A46B 15/0012; A46B 2200/3046; A46B 15/001
  See application file for complete search history.

(56) References Cited

U.S. PATENT DOCUMENTS

| 3,823,356 A | 7/1974 | Paavola et al. |
| 4,039,014 A * | 8/1977 | Sellars ...................... B60S 3/06 15/DIG. 2 |

(Continued)

FOREIGN PATENT DOCUMENTS

| CN | 201136483 Y | 10/2008 |
| CN | 206781721 U | 12/2017 |

(Continued)

OTHER PUBLICATIONS

KR 20040093820 A Written Description (Year: 2004).*

(Continued)

*Primary Examiner* — Michael E Barr
*Assistant Examiner* — Richard Z. Zhang
(74) *Attorney, Agent, or Firm* — Ewers IP Law PLLC; Falk Ewers

(57) ABSTRACT

A method for operating a vehicle treatment system, in particular a vehicle washing system, includes treating at least one vehicle surface with at least one rotating brush with a brush material at an immersion depth of the brush, and controlling during the treatment of the vehicle surface, the rotating brush based on a setpoint value for the friction of the brush material on the vehicle surface, the immersion depth of the rotating brush on the vehicle surfaces treated therewith being monitored at the setpoint value during the treatment of the vehicle surface in order to determine the (Continued)

state of the brush material. In addition, a vehicle treatment apparatus, a use thereof, and a computer program product are provided.

18 Claims, 3 Drawing Sheets

(51) Int. Cl.
*A46B 13/02* (2006.01)
*A46B 15/00* (2006.01)

(52) U.S. Cl.
CPC .......... *A46B 15/0012* (2013.01); *B60S 3/063* (2013.01); *B60S 3/066* (2013.01); *A46B 15/001* (2013.01); *A46B 2200/3046* (2013.01)

(56) References Cited

U.S. PATENT DOCUMENTS

| | | | |
|---|---|---|---|
| 6,709,530 B1 * | 3/2004 | Dietsch | B60S 3/002 134/45 |
| 11,104,306 B2 | 8/2021 | Auer et al. | |
| 2013/0180064 A1 | 7/2013 | Belanger et al. | |
| 2016/0311408 A1 * | 10/2016 | Belanger | B60S 3/063 |
| 2017/0297538 A1 * | 10/2017 | Auer | B60S 3/063 |

FOREIGN PATENT DOCUMENTS

| | | | |
|---|---|---|---|
| DE | 2243375 A1 | | 3/1973 |
| EP | 0391877 A1 | * | 10/1993 |
| EP | 1795408 A2 | | 12/2006 |
| JP | H08332926 A | | 12/1996 |
| JP | 2016060329 A | * | 4/2016 |
| KR | 20040093820 A | * | 11/2004 |
| WO | 2018153845 A1 | | 8/2018 |

OTHER PUBLICATIONS

Office Action of the German Patent and Trademark Office dated May 22, 2020 (Priority Application No. DE 10 2019 114 457.4) and English-language translation thereof.

International Preliminary Report on Patentability of the European Patent Office in PCT/EP2020-064561 (from which this application claims priority) dated Nov. 16, 2021 and English-language translation thereof.

Office Action dated Aug. 23, 2023, issued in Chinese counterpart application No. 2020800384880 and English-language translation thereof.

Chinese Search Report dated Aug. 22, 2023, issued in Chinese counterpart application No. 2020800384880 and English-language translation thereof.

* cited by examiner

METHOD FOR OPERATING A VEHICLE TREATMENT SYSTEM, VEHICLE TREATMENT SYSTEM, USE OF A VEHICLE TREATMENT SYSTEM, AND COMPUTER PROGRAM PRODUCT

CROSS REFERENCE TO RELATED APPLICATIONS

This application is a continuation application of international patent application PCT/EP2020/064561, filed May 26, 2020, designating the United States and claiming priority to German application 10 2019 114 457.4, filed May 29, 2019, and the entire content of both applications is incorporated herein by reference.

TECHNICAL FIELD

The present disclosure relates to a method for operating a vehicle treatment system, a vehicle treatment system, a use of a vehicle treatment system, and a computer program product.

BACKGROUND

Brushes of vehicle treatment systems, especially the brush material used to treat vehicle surfaces, show signs of ageing and wear in the course of their use.

According to WO2018/153845 A1, changes in the mechanical parameters of a rotating treatment brush are detected with a reference measurement at a defined reference element, for which the treatment is interrupted. The reference element is provided in the vehicle treatment system.

SUMMARY

It is an object of the disclosure to provide a method for operating a vehicle treatment system and a vehicle treatment system which enable the condition of the brush material to be monitored.

This object is achieved by a method for operating a vehicle treatment installation, a vehicle treatment system, a use thereof, and a computer program product.

One embodiment of the disclosure relates to a method for operating a vehicle treatment system, in particular a vehicle washing system, in which at least one vehicle surface is treated with at least one rotating brush with a brush material at an immersion depth of the brush, during the treatment of the vehicle surface, the rotating brush is controlled on the basis of a setpoint value for the friction of the brush material on the vehicle surface, the immersion depth of the rotating brush on the vehicle surfaces treated therewith being monitored at the setpoint value during the treatment of the vehicle surface in order to determine the state of the brush material. for operating a vehicle treatment installation In this way, the condition of the brush material of a vehicle treatment system can be determined by recording and monitoring data for the immersion depth of the rotating brush in the treatment process. A reference measurement on a specially designed reference body is not required. Also, the treatment process or a cycle of treatment processes need not be interrupted for determining the condition of the brush material. Furthermore, no specially designed sensors are required to determine the condition of the brush material.

In one embodiment of the method, the data for at least one element selected from the immersion depth of the brush and the condition of the brush material are obtained during the treatment of the vehicle surface. The evaluation of the data may therefore be performed during and/or after the treatment process. The same applies to the determination of the condition of the brush. A reference measurement on a specially provided reference body is not necessary since the data are obtained during the treatment of the vehicle.

In the process, the setpoint for the friction can be adapted accordingly, in particular reduced, during the treatment to compensate for a changing state, in particular a reducing quality state, of the brush material. Thus, an adaptive adjustment of the set point value can be performed. As a result, the number of service operations for monitoring the condition of the brush and for adjusting the setpoint can be significantly reduced.

The immersion depth of the brush may further be monitored during at least one treatment and/or a sequence of treatments of vehicle surfaces. In this way, the operational safety of the vehicle washing system is promoted and vehicle damage is avoided.

In further embodiments of the method, the immersion depth can be kept substantially constant by adjusting the set point for the friction. Thus, a gradually increasing immersion depth of the brush can be compensated.

Furthermore, the adjustment of the setpoint for the friction can be carried out stepwise and/or when a limit value of the immersion depth is reached, in particular an upper limit value of the immersion depth. This enables a reliable and operationally safe compensation of the immersion depth and thus of a changing brush condition.

In embodiments of the method, at least one element selected from the monitored immersion depth, the immersion depth data, and the brush material condition data may further be stored and statistically averaged during the treatment or during the sequence of treatments of the vehicle surfaces. In this way, individual outliers in the measured data, e.g., increased friction due to a particular contour, e.g., due to add-on parts, of a treated vehicle, can be averaged.

Furthermore, at least one step selected from monitoring the immersion depth and adjusting the setpoint for the friction can be performed automatically. As a result, the number of service operations for monitoring the brush condition and adjusting the set point can be reduced particularly efficiently.

In embodiments of the method, the at least one vehicle surface may be one or more vehicle surfaces of one or more vehicles, particularly a vehicle surface of the same type of a plurality of vehicles. The at least one vehicle surface may further be selected from a roof surface, a front surface, a rear surface, one or more side surfaces, and a combination thereof. Furthermore, the vehicle surfaces of a plurality of vehicles, in particular a plurality of vehicles of different types, may be treated. For example, in the course of a sequence of treatments, the roof surfaces of a plurality of vehicles, for example vehicles of different types, may be treated with a roof brush and the condition of the brush material may be determined based on the depth of immersion of the roof brush determined in the process.

In an embodiment of the method, the brush may be controlled using a power input of a rotary drive of the brush and the power input of the rotary drive at a known immersion depth of the brush may be used as a set point for the friction. Thus, the active power can be used as an indicator of the condition of the brush material. At the start of the treatment and/or sequence of treatments, an initial value of the set point for the friction may further be determined by moving the rotating brush to a position of a known immersion depth relative to a vehicle surface of a known position. In this way, the brush or the condition of its treatment and/or brush material can be calibrated.

To monitor and/or determine the depth of immersion, the position of the brush and the position of the vehicle surface treated therewith may be compared. Furthermore, the position of the brush and the position of the vehicle surface treated therewith, with known dimensions of the treated vehicle surface parallel and/or perpendicular to the longitudinal extension of the brush. Furthermore, the immersion depth can be monitored and/or determined taking into account at least one element selected from an immersion width of the rotating brush, an inclination angle of the brush and an inclination angle of the treated vehicle surface. In this way, changes in the immersion depth and thus in the condition of the brush can be detected without an additional reference body and/or without an additional sensor system.

In an embodiment of the method, the vehicle length, the vehicle height contour and/or the vehicle width may further be determined to determine the position of one or more vehicle surfaces. Sensor technology already present in the treatment system may be used for this purpose. At least one element selected from the position of one or more of the vehicle surfaces, the vehicle length, the vehicle height contour and/or the vehicle width may be determined during the treatment of the vehicle surfaces. Interruption of the treatment or a treatment cycle is therefore not required for this purpose.

Furthermore, the vehicle length and/or the vehicle height contour can be determined with sensors in the method. According to embodiments of the method, the vehicle width can be determined by determining an expected set value for the friction of at least one rotating side brush at a known immersion depth of the side brush on a front or rear surface of the vehicle, setting the expected set value with the side brush calibrated in this way on side surfaces of the vehicle, and determining the position of the side surfaces from the known immersion depth and the position of the side brush.

In further embodiments of the method, the brush may be kept oscillating or at a fixed or adjustable angle of inclination. In this regard, the angle of inclination of the brush may be determined, in particular with an angle sensor. Furthermore, the angle of inclination of the front, rear and/or side surfaces may be derived from the angle of inclination of a side brush.

During initial start-up or commissioning of the vehicle treatment system, basic parameters of the brushes of the system may be automatically taught using any of the foregoing methods of embodiments. Before the initial commissioning, the height contour of the vehicle can also be recorded by light barriers of the roof dryer.

In the embodiments of the method, a message may be output to an operator, in particular automatically, during the adjustment of the setpoint at a lower limit value of the setpoint, in particular at a minimum value for the power consumption of the rotary drive of the brush. This may be used as an alarm function indicating a particularly wear state or condition of the brush material.

A further embodiment of the disclosure relates to a vehicle treatment system, in particular a vehicle washing system, comprising at least one brush with a brush material for treating vehicle surfaces. The brush is rotatably mounted and movable into a vehicle treatment position at an immersion depth of the brush on a vehicle surface to be treated. The vehicle treatment system further includes a brush traversing device for traversing the brush in positions relative to the vehicle surface to be treated; a brush rotary drive, a sensor for detecting a friction of the brush material against the vehicle surface to be treated, in particular a power input sensor of the rotary drive, means for detecting the position of one or more of the vehicle surfaces, and a data processing memory and control unit. The memory and control unit are connected in a data-conducting manner or are in data exchange to at least one unit selected from the brush traversing device, the brush rotary drive, the sensor for determining a friction of the brush material on the vehicle surface to be treated, and the device for determining the position of one or more of the vehicle surfaces. The storage and control unit is configured to store data received from these units. The storage and control unit is configured to control the method according to any of the embodiments.

According to embodiments of the vehicle treatment system, at least one element selected from the brush, the brush traversing device and the brush rotation drive may be controllable with the memory and control unit. Further, a program, in particular a computer program, may be implemented in the memory and control unit, which is configured to cause the memory and control unit and/or the vehicle treatment system to perform a method according to any of the preceding embodiments.

Another embodiment of the disclosure relates to a use of a vehicle treatment system according to any one of the preceding embodiments for carrying out a method according to any one of the preceding embodiments.

Further embodiments of the disclosure relate to a computer program product including program elements which cause a server or a computer or an execution unit, in particular a storage and control unit of a vehicle treatment system according to one of the above embodiments and/or a vehicle treatment system according to one of the above embodiments, to execute the method according to one of the above embodiments when the program elements are loaded into a memory of the server or the computer or the execution unit, in particular into the storage and control unit of the vehicle treatment system. Embodiments provide a corresponding computer program and/or a computer-readable medium on which the computer program is stored. The server, computer or execution unit may be wired or wirelessly connected to and/or integrated with the vehicle treatment system.

In the aforementioned embodiments of the vehicle treatment system and/or the computer program product and/or the computer program, corresponding modifications may be implemented as in the embodiments of the method for operating a vehicle treatment system explained above, and these may enable the same beneficial effects as the embodiments of the method with corresponding features explained above.

In the following detailed description of the figures, further embodiments which are not to be understood restrictively will be explained with their features and further advantages on the basis of the figures. All the features or method steps of embodiments described herein, which are not mutually exclusive, can be combined with one another. Identical elements of the embodiments are provided with the same reference signs in the following description. Elements of one embodiment may be used in the other embodiments without further mention.

BRIEF DESCRIPTION OF THE DRAWINGS

The disclosure will now be described with reference to the drawings wherein.

DESCRIPTION OF EXEMPLARY EMBODIMENTS

The exemplary embodiments of the vehicle treatment system and the process carried out therewith shown in FIGS. 1A to 3 are described with reference to a gantry or portal treatment system, for example a gantry car wash. However, the disclosure is not limited thereto and can also be implemented in any embodiment in an analogously modified manner, for example, with a treatment line, e.g., a car wash.

When treating a vehicle surface with a rotating brush, the treated vehicle surface is immersed in the treating brush material. This results in an immersion depth and possibly an immersion width of the brush during the treatment. The immersion depth of the brush is understood herein in relation to the distance of the axis of rotation of the brush from the treated vehicle surface, at which the rotating brush comes to rest during treatment. As the axis of rotation of the brush approaches the vehicle surface during treatment, that is, as the distance of the axis of rotation from the vehicle surface decreases, the immersion depth increases. The immersion width of a brush is understood herein as the dimension parallel to the axis of rotation of the brush with which the vehicle surface is immersed in the brush material. The immersion width of a side brush is also referred to as the immersion height in examples.

Figure 1A:
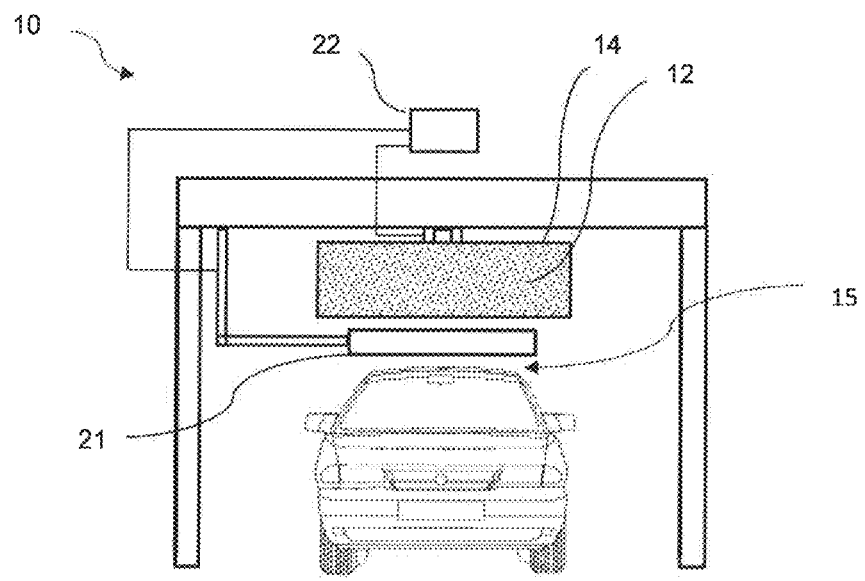
FIG. 1A schematically shows a frontal view of the vehicle treatment system after a vehicle has been run in according to an exemplary the method of embodiment of the disclosure, FIG. 1B schematically shows the system of FIG. 1A during a treatment according to one exemplary embodiment of the process according to the disclosure, FIG. 2A schematically shows a further exemplary embodiment of the vehicle treatment system after the vehicle has been run in, FIGS. 2B and 2C schematically show the system of FIG. 2A during a treatment according to one exemplary embodiment of the process, and FIG. 3 schematically shows a modification of the system and method of FIGS. 2A to 2C.
Figure 1B:
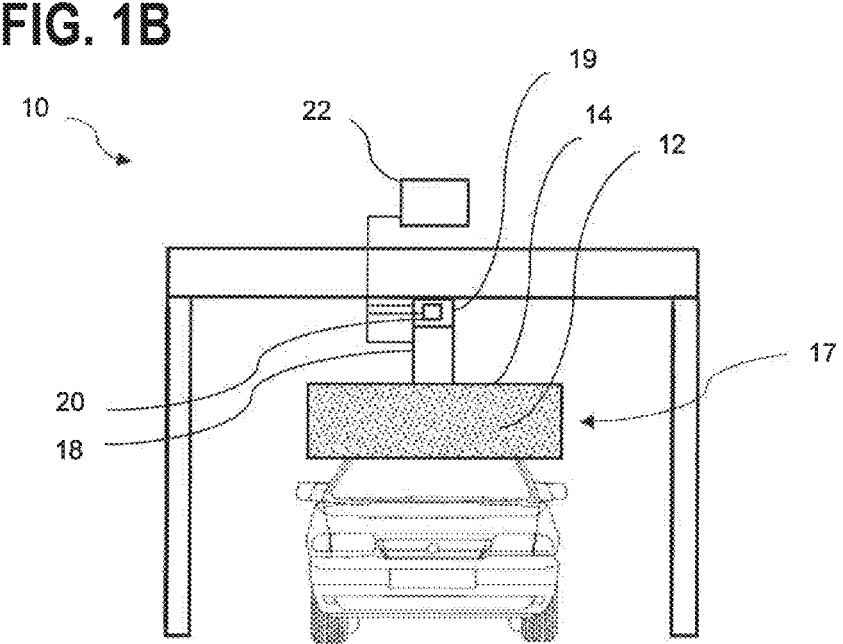

FIG. 1A schematically shows an example of the vehicle treatment system (hereinafter also referred to as system) 10 according to the disclosure after a vehicle to be treated has been run in, in frontal view. FIG. 1B illustrates the system 10 in operation. The vehicle has a roof surface 15.

In the system 10, a frame or portal with a crossbar is provided, on which a substantially horizontally oriented roof brush 14 with a brush material 12 for treating vehicle surfaces is arranged with a suspension 13. In the present case, the brush material 12 includes bristles, for example polyethylene (PE) foam, PE filaments or polypropylene (PP) felt. The brush is rotatably mounted on the suspension 13 and is lowerable to a vehicle treatment position 17 at an immersion depth of the brush on the roof surface 15, as illustrated in FIG. 1B. To this end, the suspension 13 of the vehicle treatment system 10 includes a brush traversing device 18 for lowering the brush into positions relative to the roof surface 15. The suspension 13 further includes a brush rotation drive 19 for rotating the brush during the treatment process. The brush rotation drive 19 has a power input sensor 20, the latter serving in the present example as a sensor for detecting a friction of the brush material 12 against the roof surface 15 to be treated.

The system 10 also has a roof dryer 21 (shown only in FIG. 1A), which is used in the present case as a device for determining the position of the roof surface. The roof dryer 21, or its light barriers, is/are used to determine the height contour of the vehicle, which can be done at the beginning of the treatment of the vehicle. Additionally or alternatively, the 3D contour of the vehicle may also be determined. For the detection of the height contour and/or the 3D contour, an image capture device, light barriers or light grids, and/or radar or ultrasonic sensors may be provided as a device for determining the position and dimensions of the vehicle surfaces, in this case in particular the roof surface, in addition or alternatively to the roof dryer.

The system 10 further includes a data processing storage and control unit 22. The storage and control unit 22 is connected in a data conducting or transmitting manner to the brush traversing device 18, the brush rotation drive 19, the sensor 20 for determining a friction of the brush material on the roof surface and the roof dryer 21. Data transmitted and/or received by these units is and/or are stored and processed in the storage and control unit 22. The storage and control unit 22 is configured to control the method according to one of the exemplary embodiments. For this purpose, the memory and control unit 22 implements a program and/or control instructions adapted to execute and/or control a method according to one of the embodiments. The program may be implemented by a computer program product or computer program, the program elements of which cause the memory and control unit 22 and the apparatus 10 to execute a vehicle treatment procedure when the program elements are loaded into the memory and control unit 22. The brush traversing device 18 and the brush rotation drive 19 are controllable with the memory and control unit 22.

In an exemplary operation of the system 10, the height contour of the vehicle is traversed by the roof dryer 21 prior to treatment and the height contour data is stored in the storage and control device 22.

Then, for the treatment of the roof surface 15, the roof brush 14 is rotated by the drive 19. The rotating roof brush 14 is lowered in the direction of the roof surface 15 by the brush traversing device 18 until the brush material 12 is positioned with an immersion depth at the roof surface 15. In an alternative mode of operation, the brush may also be rotated after lowering. The roof surface 15 is now treated with the brush material 12 at the desired depth of immersion of the brush.

During the treatment of the roof surface 15, the rotating roof brush 14 is guided and controlled along the roof surface based on a set value for the friction of the brush material 12. The setpoint value for the friction can be derived, for example, from a manufacturer's specification for the brush material 12, which provides an orientation as to which values for the friction or for the effective power of the brush rotation drive, can be expected for different dimensions of the treating brush body of the rotating brush parallel to its axis of rotation, at which immersion depth of the unused brush material. In the present exemplary embodiment, these values are correlated in the storage and control device 22 with the power consumption of the brush rotation drive 19. In this manner, a set point for the power input corresponding to the desired depth of immersion is determined and stored as the set point for the friction. For the control, the power consumption sensor 20 of the brush rotation drive 19 detects an actual value of the power consumption. This is compared in the storage and control device 22 with the stored setpoint value. The storage and control device 22 modifies the control commands for the brush drive 19 accordingly, in order to bring about alignment with and compliance with the setpoint value.

In the course of the treatment of the roof surface 15, the immersion depth of the rotating brush 14 at the roof surface 15 is continuously or discontinuously monitored with the storage and control device 22, while the setpoint for the power consumption is substantially maintained, typically taking into account the dimension(s) of the roof surface parallel to the rotation axis of the brush, for example the roof width. For this purpose, the position of the roof brush 14 known from the control system is compared with the position of the roof surface 15 known from the height contour detection. As long as the immersion depth remains substantially the same during the course of treatment, a good condition of the brush material is determined. In this example, a good condition is equated to a brush material that is not worn. If the immersion depth becomes higher during the course of the treatments, a deteriorating condition of the brush material is determined, for example due to wear.

With the method as described above, the determination of the condition of the brush material does not require a reference measurement on a reference body specifically provided in or outside the installation. Furthermore, no additional measurement technology and/or sensor technology needs to be provided in the system 10 for determining the condition of the brush material.

According to a variation of the method of the preceding example, during the treatment to compensate for a changing condition of the brush material, the setpoint for the friction is adjusted accordingly. In particular, when a decreasing quality condition of the brush material, such as a wear condition, is detected, the setpoint for the friction, in the preceding example the setpoint for the power consumption, may be decreased. In this way, the immersion depth of the brush may be kept substantially constant to promote operational safety and prevent vehicle damage. Further, the adjustment of the friction set point may be performed incrementally and/or when the immersion depth reaches an upper limit. Thus, an adaptive adjustment of the setpoint may be performed to provide reliable and operationally safe compensation for an increasing immersion depth and a changing brush condition.

In further exemplary embodiments of the method, a message is output to an operator, in particular automatically, during the adjustment of the setpoint at a lower limit value of the setpoint, in particular at a minimum value for the power consumption of the rotary drive of the brush. This may be used as an alarm function indicating a particularly worn condition of the brush material.

In further exemplary embodiments of the method, the immersion depth data is determined, stored and/or statistically averaged during at least one treatment of a vehicle surface or during a sequence of treatments of vehicle surfaces. For example, a plurality of successive treatments are performed on a plurality of vehicles according to the exemplary embodiment shown in FIGS. 1A and 1B. In each case, the roof surfaces of the vehicles are treated, and the condition of the brush material is determined based on the behavior of the roof brush 14. This can also apply to vehicle treatment systems in which further brushes of the same material are used in addition to the roof brush. The roof brush can thus serve as a reference brush. The vehicles can also be of different types. Particularly in the case of a longer sequence of treatments, individual outliers in the measurement data, for example increased friction due to a particular contour of a treated vehicle, can be eliminated by statistical averaging. In addition, monitoring of the immersion depth and/or adjustment of the friction set point may be automatic. This can efficiently reduce the number of service calls required to monitor brush condition and manually adjust the set point.

As described, in the method of the exemplary embodiment shown in FIGS. 1A and 1B, the brush is controlled with a power consumption of a rotary drive of the brush and a value for the power consumption of the rotary drive at a known immersion depth of the brush is used as a setpoint for the friction. Thus, the active power is used as an indicator of the condition of the brush material. At the start of treatment, as an alternative to or in combination with a set point derived from a manufacturer's specification, an initial value of the set point for friction may further be determined by moving the rotating brush to a position of a known immersion depth relative to a vehicle surface of known position. In this way, the brush or the condition of the brush material can be calibrated.

The method of the exemplary embodiment shown in FIGS. 1A and 1B can be performed analogously for one or more other brushes of a vehicle treatment system, such as one or more side brushes, instead of using the roof brush or in addition to the roof brush.

In the method of the exemplary embodiment shown in FIGS. 1A and 1B, the position of the brush and the position of the vehicle surface treated therewith are compared for monitoring and/or determining the immersion depth. Additionally or alternatively, the position of the brush and the position of the vehicle surface(s) treated therewith may be compared taking into account known dimensions of the treated vehicle surface(s) parallel and/or perpendicular to the longitudinal extension of the brush. These dimensions, as well as the position of the brush, can be determined with sensors present in the installation 10. In this way, changes in the immersion depth due to different dimensions of the treated vehicle surfaces and/or due to different immersion widths/heights of the brush can be reliably determined and taken into account without the need for an additional reference body and/or without the need for additional sensors. In exemplary embodiments, the longitudinal extension of the brush may correspond to the extension of the brush parallel to its axis of rotation.

For example, to determine the dimensions and/or position of one or more vehicle surfaces, the vehicle length, the vehicle height contour and/or the vehicle width may be determined. For this purpose, sensor technology and measuring devices already present in the treatment system 10 can be used and their measurements can be aligned. For example, the sensor technology may be an image capture device, light barriers or light grids, and/or radar or ultrasonic sensors. Therefore, the positions of one or more of the vehicle surfaces, the vehicle length, the vehicle height contour, and/or the vehicle width may be determined during the treatment of the vehicle surfaces, without interrupting the treatment or a treatment cycle.

In further exemplary embodiments of the vehicle treatment system and/or method, the condition of the brush material may alternatively or additionally be determined using brushes other than the roof brush, such as with a side brush.

Figure 2A:
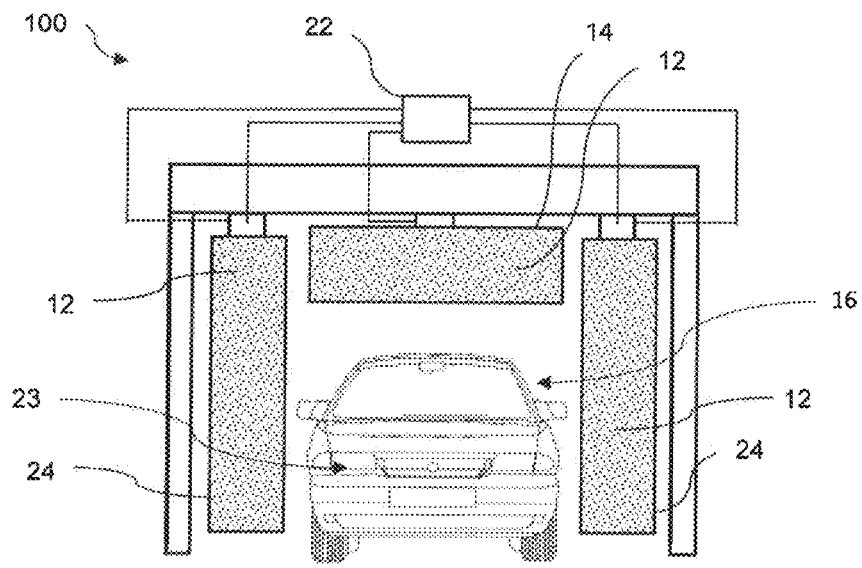
Figure 2B:
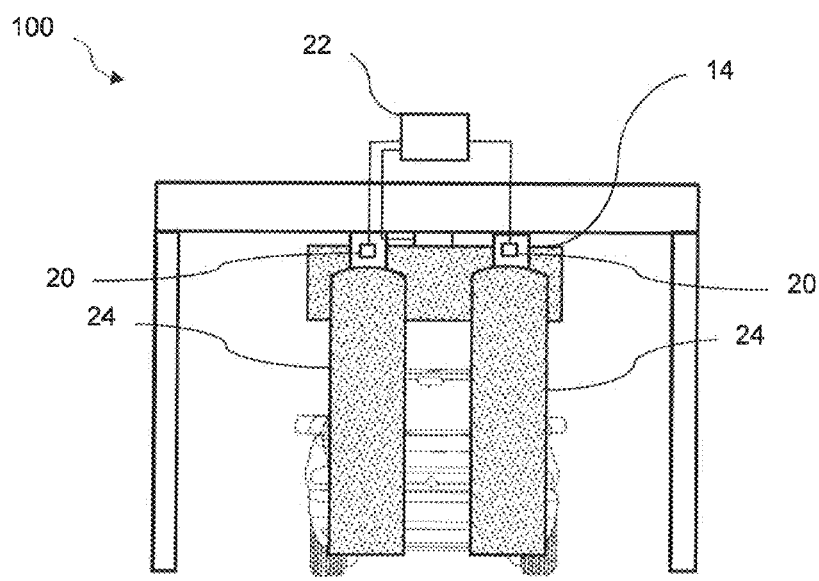
Figure 2C:
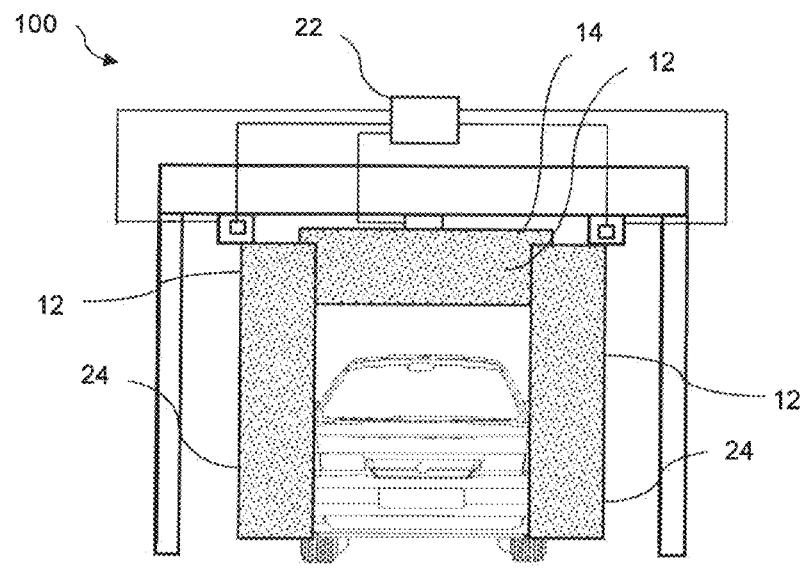

FIGS. 2A to 2C show, as a further exemplary embodiment, a vehicle treatment system 100 with a roof brush 14 and two side brushes 24, which are analogous to the roof brush 14. FIG. 2A shows a front view of the vehicle treatment system 100 after a vehicle has been driven in, having a front surface 23, a roof surface 15 and two side surfaces 16. The storage and control unit 22 is connected to both the roof brush 14 and the side brushes 24, for the purpose of controlling and regulating the side brushes as well. The side brushes 24 each include, like the roof brush 14, a brush traversing device, a brush rotation drive, and a sensor for detecting a friction of the brush material (each not shown in FIGS. 2A to 2C). The storage and control unit 22 is connected to these in a data-conducting manner in order to store and process data transmitted and/or received by these units.

In an exemplary operation of the system 100, a treatment of the side surfaces 16 with the side brushes 24 is performed in a manner analogous to the treatment of the roof surface 15 with the roof brush 14, as described with reference to FIG. 1A and 1B. In this regard, during the treatment of the vehicle surface to determine the condition of the brush material, the immersion depth of the rotating side brushes 24 on the vehicle surfaces treated therewith is monitored at the set point.

In one example, the vehicle handling system 100 first performs an initial contouring of the vehicle as it enters the system. For this purpose, a traverse of the crossbar with a camera is performed over the entire length of the vehicle. This determines the position of the roof surface, the front surface, the rear surface and the side surfaces of the vehicle in the installation 100. Then the front surface 23 is treated, by moving the side brushes 24 along the traverse substantially parallel to the front surface and by moving the side brushes along the front surface 23, as shown in FIG. 2B. Thereafter, the side brushes 24 are moved towards the side surfaces 16 of the vehicle by displacing their suspension along the traverse and are moved along the side surfaces 16 during treatment thereof by displacing the traverse substantially parallel to the side surfaces 16, as shown in FIG. 2C. During the treatment of the respective vehicle surfaces, the immersion depth of the rotating side brushes 24 at the side surfaces 16 treated therewith is monitored at the set point to determine the condition of the brush material, analogous to the example of treating the roof surface 15 with the roof brush 14 as described with reference to FIGS. 1A and 1B. Thereupon, the rear surface is treated in the same manner as the front surface 23. Simultaneously, the roof surface 15 is treated with the roof brush 14 as described above with reference to FIGS. 1A and 1B. A different sequence of treatments of the vehicle surfaces is also conceivable.

According to one exemplary embodiment, after brushes with unused brush material are installed in the system 100, an initial calibration of the brush material may be performed during treatment, as described below for the side brushes:

A set value for the friction of the rotating side brush(es) 24 at a known immersion depth of the side brush(es) is determined. For this purpose, the side brushes 24 are set in rotation about their axis of rotation (also called axis of rotation). Then the side brushes 24, by moving the crossbar and by moving the suspension of the side brushes along the crossbar, are moved towards the front surface 23 of the vehicle, the position of which is known by light barriers. This is shown schematically in FIG. 2B. Instead of the front surface, another vehicle surface of known position can also be used.

When the side brushes 24 approach the front surface, a manufacturer's specification/factory specification for the brush material 12 is taken into account, which provides an orientation as to which values for the friction or for the effective power of the brush rotation drive are/is to be expected at which dimension of the treating rotating brush body, i.e., at which power which immersion depth of the unused brush material 12. The rotating side brush 24 to be calibrated, or both rotating side brushes 24 to be calibrated, is/are moved to a position of an immersion depth known from the manufacturer's specification and desired for the treatment process relative to the front surface 23, the height of which is known. The power consumption of the rotary drive of the side brush 24 to be calibrated, determined in this position, is stored as an initial value of the set value for the friction in the storage and control device 22, taking into account the known height of the front surface as an immersion height of the side brush, and is used in the further treatment procedure. In the case of two side brushes 24 to be calibrated, the determined power consumption may be averaged. In this manner, the side brush(es) 24 are calibrated with the unused brush material. The roof brush 14 may be calibrated with unused brush material in an analogous manner.

If recalibration of the respective brushes is desired due to a condition of the brush material changing with use, an adaptive adjustment of the friction set point is performed as described above with respect to the method of the example of FIGS. 1A and 1B.

A determination of the position of vehicle surfaces, e.g., in addition to the initial contour detection, can be carried out during the treatment of the vehicle as follows, as described on the basis of the vehicle width and the position of the side surfaces:

First, in the vehicle treatment system 100, the initial contour detection of the vehicle entering the system takes place, in which, among other things, the position and height of the front surface of the vehicle as well as the height of the side surfaces in the system 100 are determined. As the treatment proceeds, at least one side brush 24 is moved to the front surface, the positions of the side brush and the front surface being known. At the front surface of known height, an expected desired value for the friction or power consumption of the rotating side brush 24 is determined at a desired immersion depth of the side brush, that is, at a desired distance between the side brush and the front surface (immersion depth), and at an immersion height corresponding to the height of the front surface. The at least one rotating side brush 24 calibrated in this way is now used to set the expected target value at each of the side surfaces 16 of the vehicle, taking into account the known height of the side surfaces, i.e., the immersion height. The vehicle width and the position of the side surfaces 16 are then determined from the known immersion depth and the known position of the side brush. Instead of the front surface, the rear surface (or other vehicle surface) of known position may be used to calibrate the side brush. The width of the vehicle roof can also be derived from the vehicle width determined in this way.

In further exemplary embodiments of the vehicle treatment system and the method, at least one side brush is/are held oscillating or at a fixed or adjustable angle of inclination. This is shown schematically in FIG. 3 for the side brushes 24. In the associated method, the angle of inclination of the respective brush can be determined, in particular with an angle sensor including for example a magnet and a magnetic field sensor. Furthermore, the angle of inclination of the front, rear and/or side surfaces may be determined with sensors and/or derived from the angle of inclination of a side brush. The latter can be done, for example, by approaching a side brush, freely oscillating, and suspended from a boom arm and rotating, to the vehicle surface to be treated, supporting the brush against the surface and determining the angle of inclination of the brush thus set, which corresponds substantially or on average to the angle(s) of inclination of the surface. The angle of inclination of the side brushes and/or the side surfaces may further be used to determine the width of the roof surface, as part of the determination of the vehicle width described above. The angle of inclination of the brush and/or the vehicle surface treated therewith may be taken into account in the method of operating a vehicle treatment system of the preceding embodiments for determining the set point for the friction and/or for determining the immersion depth. Further, during treatment of inclined vehicle surfaces, the brushes may be oriented substantially parallel to the vehicle surfaces to provide a substantially uniform depth of immersion parallel to the axis of rotation of the brush.

Figure 3:
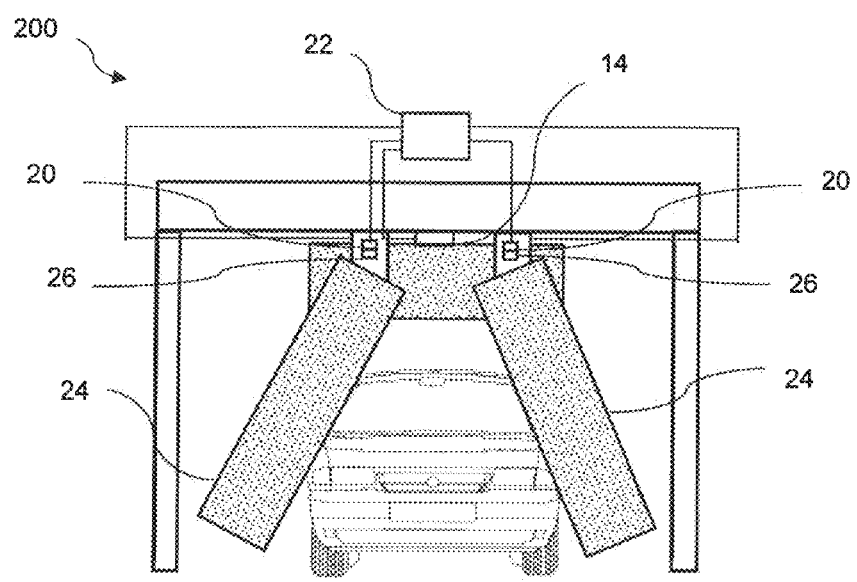

The system 100 shown in FIGS. 2A to 2C and the system 200 shown in FIG. 3 include a plurality of side brushes and a roof brush, while the system 10 shown in FIGS. 1A and 1B has only one roof brush. Alternatively, the processes described with reference to these figures may be carried out analogously in a system having one or more brushes selected from one or more roof brushes, one or more side brushes, and any combination thereof.

Thus, according to an aspect of the disclosure, in a vehicle treatment system equipped, for example, with angle sensors, power measurement, length measurement and/or light barriers, a treatment brush or its condition can be monitored by recording power and position data in the treatment process and determining the brush condition by evaluating them subsequently. The data can be stored for a larger number of vehicles and statistically averaged to eliminate individual outliers due to unusual vehicle contours. From a certain deviation from the original setpoint value of the active power, which is used in the present case as a measure of the friction of the brush on the vehicle surface, the setpoint value can be readjusted up to a predetermined limit. The vehicle surfaces, the positions of which can be determined relatively accurately by aligning the different sensors, serve as a reference for determining the setpoint.

In one exemplary embodiment, the vehicle length is determined by a transverse photoelectric sensor, and the vehicle height contour is determined by dryer fan photoelectric sensors. Using the known front and rear position and the known height of the front or rear, an expected target value of the active power for the side brush can be determined as described above, which is achieved at a known immersion depth. If the setpoint is reached as expected, it can be assumed with sufficient certainty that the side brush is at a known position. Accordingly, with the side brush calibrated in this way, the position of the two vehicle side surfaces can be determined on the side of the vehicle when the target value for the active power measurement is reached, from which the width of the vehicle and/or the vehicle roof, which is the reference surface for the roof brush, can be derived. By comparing the height contour detected by the roof dryer with the height of the roof brush when the width of the vehicle and/or the vehicle roof is known and the set value for the power consumption of the roof brush is maintained, it is possible to evaluate whether the brush material is losing stiffness and to correct the set value accordingly. The same applies to the adjustment of the side brushes at the front and rear of the vehicle.

During initial start-up of the vehicle treatment system, basic parameters of the brushes of the system may be automatically taught using any of the foregoing exemplary embodiments of the methods. Furthermore, the roof dryer contour can be recorded prior to the initial commissioning.

The vehicle treatment system and the method for operating a vehicle treatment system according to exemplary embodiments of the disclosure improve the treatment result, increase the operational safety of the system, and prevent vehicle damage because the condition of the brush material can be reliably monitored. In particular, the condition of the brush material of the vehicle treatment system can be determined by recording and monitoring data for the immersion depth of the rotating brush in the treatment process. A reference measurement on a reference body specifically provided for this purpose is not required. Furthermore, no specially provided sensor system is required for determining the condition of the brush material. Also, the treatment process or a cycle of treatment processes need not be interrupted for determining the condition of the brush material and other steps of the process. In some exemplary embodiments, all or at least a majority of the steps of the method may be performed during the treatment of the vehicle surface(s).

Finally, it should be noted that the description of the disclosure and the embodiments are in principle not to be understood restrictively with respect to any particular physical realization of the disclosure. All features explained and shown in connection with exemplary embodiments of the disclosure may be provided in different combinations in the subject matter according to the disclosure in order to simultaneously realize their advantageous effects.

The scope of protection of the present disclosure is given by the claims and is not limited by the features explained in the description or shown in the figures.

In particular, it is obvious to a person skilled in the art that the disclosure can be applied not only to vehicle treatment installations but also to other installations for treating objects, for example aircraft. Furthermore, the devices of the installation 10, 100, and 200 can be implemented distributed over several physical devices.

LIST OF REFERENCE NUMERALS

10/100/200 Device for cleaning a vehicle having at least one external surface
12 Brush material
13 Suspension
14 Roof brush
15 Roof area
16 Side surface
17 Vehicle treatment position
18 Brush traverser or brush traversing device
19 Brush rotation drive
20 Sensor for detecting a friction of the brush material
21 Device for determining the position of the vehicle surface
22 Storage and control unit
23 Front surface
24 Side brush
26 Device for monitoring the angle of inclination of the cleaning brush

What is claimed is:
1. A vehicle treatment system, comprising:
at least one rotating brush configured to treat vehicle surfaces and being made of a brush material, the at least one rotating brush being rotatably mounted and movable into a vehicle treatment position at an immersion depth of the at least one rotating brush on a vehicle surface to be treated;
a brush traversing device configured to move the at least one rotating brush into positions relative to the vehicle surface to be treated;
a brush rotation drive;

a sensor configured to detect a friction of the brush material on the vehicle surface to be treated;

a device configured to detect a position of one or more of the vehicle surfaces; and a data processing storage and control unit connected in a data-conducting manner to at least one unit selected from the brush traversing device, the brush rotaryrotation drive, the sensor configured to detect the friction of the brush material on the vehicle surface to be treated, and the device configured to detect the position of the one or more of the vehicle surfaces, wherein the data processing storage and control unit is configured to:

receive data from the at least one unit, store the data received from the at least one unit, control the at least one rotating brush to treat at least one vehicle surface with the brush material at the immersion depth based on a desired value for the friction, determining a condition of the brush material by:

monitoring during treatments of a plurality of vehicles, values of the immersion depth of the at least one rotating brush at the desired value for the friction, storing the values of the immersion depth of the at least one rotating brush monitored during the treatments of the plurality of vehicles, and statistically averaging the stored values of the immersion depth.

2. The vehicle treatment system according to claim 1, wherein the data processing storage and control unit is further configured to:

control at least one of the brush traversing device and the brush rotation drive, and monitor, during the treatment of the at least one vehicle surface, the immersion depth of the at least one rotating brush at the desired value for the friction to determine the condition of the brush material.

3. A method of using the vehicle treatment system according to claim 1 the method comprising the steps of:

treating at least one vehicle surface with the at least one rotating brush at an immersion depth of the at least one rotating brush; and controlling during the treatment of the at least one vehicle surface the at least one rotating brush based on a desired value for the friction of the brush material on the at least one vehicle surface, wherein during the treatment of the at least one vehicle surface the immersion depth of the at least one rotating brush is monitored at the desired value in order to determine the condition of the brush material.

4. A non-transitory computer readable medium having a computer program product stored thereon for execution by a computer to implement a method of using the vehicle treatment system according to claim 1, the method comprising the steps of:

treat at least one vehicle surface with the at least one rotating brush at an immersion depth of the at least one rotating brush; and control during the treatment of the at least one vehicle surface the at least one rotating brush based on a desired value for the friction of the brush material on the at least one vehicle surface, wherein during the treatment of the at least one vehicle surface the immersion depth of the at least one rotating brush is monitored at the desired value in order to determine the condition of the brush material.

5. The vehicle treatment system according to claim 1, wherein the sensor is a power consumption sensor of the brush rotation drive.

6. The vehicle treatment system according to claim 2, wherein the data processing storage and control unit is further configured to: adjust a setpoint for the friction during the treatment of the at least one vehicle surface to compensate for a changing condition.

7. The vehicle treatment system according to claim 6, wherein the changing condition is a decreasing quality condition of the brush material, and wherein the data processing storage and control unit is further configured to:

reduce the setpoint for the friction to compensate for the decreasing quality condition of the brush material.

8. The vehicle treatment system according to claim 6, wherein the data processing storage and control unit is further configured to:

keep the immersion depth substantially constant by adjusting the setpoint for the friction, and/or adjust the setpoint for the friction stepwise and/or when a limit value of the immersion depth is reached.

9. The vehicle treatment system according to claim 1, wherein the at least one vehicle surface is one or more vehicle surfaces of one or more vehicles, and/or wherein the at least one vehicle surface is selected from a roof surface, a front surface, a rear surface, one or more side surfaces and a combination thereof.

10. The vehicle treatment system according to claim 1, wherein the data processing storage and control unit is further configured to:

control the at least one rotating brush with a power consumption of the brush rotation drive, wherein a value for the power consumption of the brush rotation drive at a known immersion depth of the at least one rotating brush is used as a setpoint for the friction, and/or determine, at a start of a treatment or of a sequence of treatments, an initial value of the setpoint for the friction by moving the at least one rotating brush to a position of a known immersion depth relative to a vehicle surface of a known position.

11. The vehicle treatment system according to claim 1, wherein the data processing storage and control unit is further configured to:

compare a position of the at least one rotating brush and a position of a vehicle surface treated with the at least one rotating brush in order to monitor the immersion depth of the at least one rotating brush.

12. The vehicle treatment system according to claim 11, wherein the data processing storage and control unit is further configured to:

compare the position of the at least one rotating brush and the position of the vehicle surface treated with the at least one rotating brush using known dimensions of the treated vehicle surface parallel and/or perpendicular to a longitudinal extension of the at least one rotating brush.

13. The vehicle treatment system according to claim 1, wherein the data processing storage and control unit is further configured to:

determine a vehicle length, a vehicle height contour and/or a vehicle width.

14. The vehicle treatment system according to claim 1, wherein the data processing storage and control unit is further configured to:

determine a vehicle length and/or a vehicle height contour with sensors, and/or determine a vehicle width by determining an expected set value for a friction of at least one rotating side brush at a known immersion depth of the at least one rotating side brush on a front vehicle surface or a rear vehicle surface.

15. The vehicle treatment system according to claim 1, wherein the at least one rotating brush is held oscillating or held at a fixed or adjustable angle of inclination.

16. The vehicle treatment system according to claim 15, further comprising:

an angle sensor configured to determine an angle of inclination of the at least one rotating brush, and wherein the data processing storage and control unit is further configured to: derive an angle of inclination of a vehicle surface from an angle of inclination of a side brush.

17. The vehicle treatment system according to claim 1, wherein basic parameters of the at least one rotating brush are automatically taught-in during an initial start-up of the vehicle treatment system.

18. The vehicle treatment system according to claim 6, wherein the data processing storage and control unit is further configured to:

output a message to an operator during an adaptation of the setpoint for the friction at a lower limit value of the setpoint for the friction, or at a minimum value for a power consumption of the brush rotation drive.

* * * * *